April 21, 1936.  E. BROWN  2,037,962

PIPE JOINT AND METHOD OF MAKING THE SAME

Filed June 15, 1933

Inventor:
Edmund Brown,
By Jas. C. Nobusmith
Attorney.

Patented Apr. 21, 1936

2,037,962

UNITED STATES PATENT OFFICE 2,037,962

PIPE JOINT AND METHOD OF MAKING THE SAME

Edmund Brown, Palmyra, N. J.

Application June 15, 1933, Serial No. 675,917

1 Claim. (Cl. 285—111)

My invention relates to pipe joints and the method of making the same, and it relates more particularly to the making of a welded pipe joint of the bell and spigot type.

In the art of making joints of pipes of weldable material, the disadvantages of a butt welded joint are well known and need not be further discussed. Recourse has therefore been had to bell and spigot structures, but in the various forms of such structures as heretofore suggested there occurred at the joint a lack of continuity of the internal diameter of the pipe line, usually in the form of an annular recess. In many instances distinct annular crevices were formed, in which the material conveyed through the pipe would find access.

If it were possible to weld two lengths of pipe to each other by an internal weld, such recesses and crevices could be eliminated, but this is obviously impossible except in the case of exceedingly large diameters. The desirability of eliminating such recesses and crevices is apparent, as the occurrence of an annular recess at each joint sets up a considerable disturbance, in the nature of eddies and swirls, in the fluid conveyed through the pipe, which, particularly in long pipe lines, greatly increases the frictional resistance to the flow. Furthermore, such recesses and crevices not only provide places for the collection of contaminating deposits, but also form starting points for corrosion, which ultimately results in the destruction of the pipe.

It is also well known that in the formation of welded pipe joints, unless the work is carefully done by the most expert artisans, the walls of the pipe are frequently weakened adjacent the weld. Also in the forms of welded pipe joints now commonly made, the strains which occur by reason of improper support of the pipes, or otherwise, are taken up entirely by the weld, so that unless the weld is very carefully made, fractures frequently occur at that point.

The object, therefore, of my present invention is to provide a welded pipe joint which embodies adequate structural strength, in which the joint is effectively closed internally, and in which the danger of weakening the metal of the pipe at the point where the weld is made is greatly minimized.

The nature and characteristic features of my invention will be more readily understood from the following description, taken in connection with the accompanying drawing forming part hereof, in which.

Figure 1:
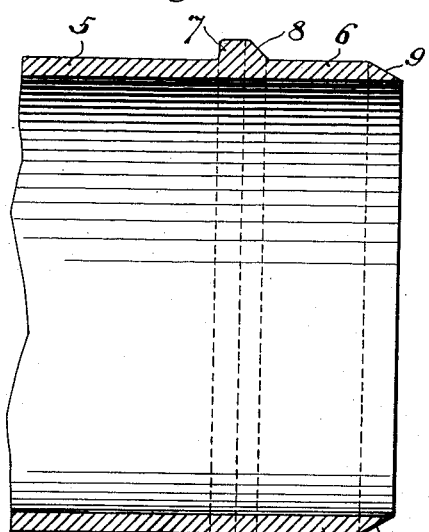
Figure 1 is a central longitudinal sectional view of the spigot end of one of the pipes to be joined.
Figure 2:
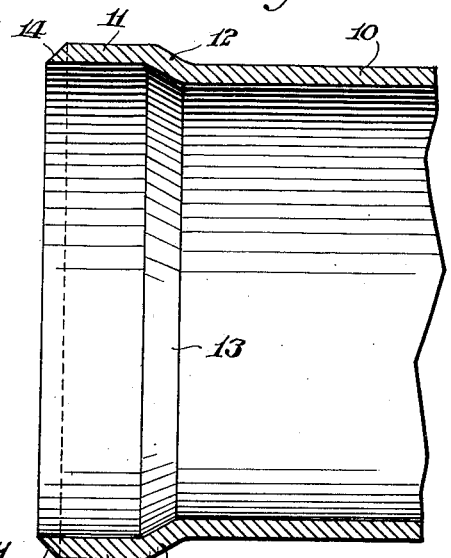
Fig. 2 is a similar view of the bell end of the other pipe.
Figure 3:
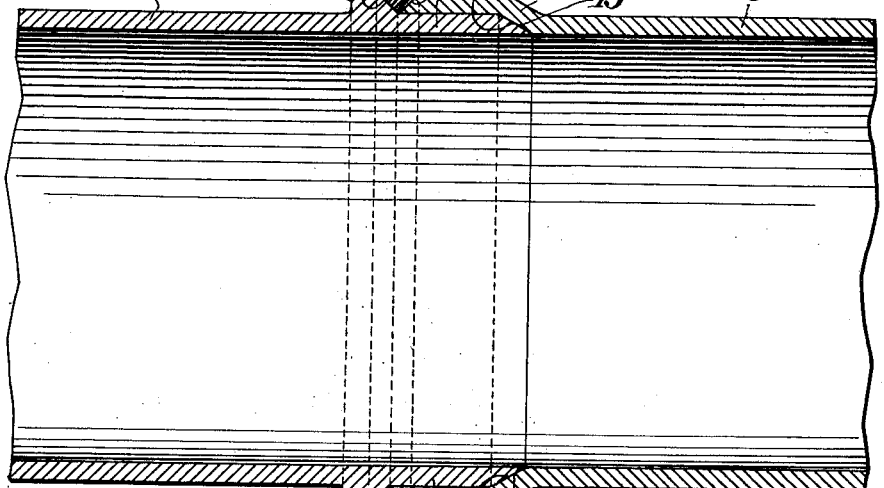
Fig. 3 is a similar view of the completed joint.

The end of the section of pipe 5 upon which the spigot 6 is to be formed is first upset, to form thereon an integral external annular welding shoulder 7, the face 8 of which, on the side toward the end of the spigot, is suitable inclined, or made frusto-conical in shape. The end of the spigot is then chamfered, as at 9, preferably by machining, so as to insure a smooth frusto-conical surface at the end of said pipe. In the formation of the spigot portion, the same is so fabricated that there is no reduction in wall thickness at any place.

The end of the other section of pipe 10, which is to be jointed to the section 5, is enlarged to form a bell 11, of such internal diameter as to make a snug fit on the spigot 6. The bell end of this section 10 is also preferably upset, so that there will be no diminution in wall thickness, particular where the enlarged bell end merges as at 12, into the main body of the pipe.

The surface 13 of the internal shoulder which is provided where the bell portion 11 merges into the body portion of the pipe 10, is also smoothed, preferably by machining, the same being shaped complementally to the smooth frusto-conical end 9 of the spigot portion 6 of the pipe section 5. The end of the bell portion 11 is also chamfered, as at 14.

The lengths of the spigot and bell portions of the two sections of the pipe are such with respect to each other, that when the spigot 6 is inserted in the bell 11, and the smooth end 9 of the spigot is brought into engagement with the smooth surface 13 of the internal shoulder of the bell, the inclined surface 8 of the welding shoulder 7 will be so positioned with respect to the chamfered end 14 of the bell portion 11 as to provide an annular welding groove having adjacent inclined surfaces.

The two sections of pipe being joined are held during the welding operation by any preferred type of clamping device (not shown), which will serve to maintain the inclined end 9 of the spigot portion 6 in close contact with the surface 13 of the internal shoulder. The welding is accomplished by the deposition of welding metal 15 in the annular groove provided between the shoulder 7 on the spigot portion 6 and the chamfered end 14 of the bell portion 11, by an electric arc, oxy-acetylene process, or similar means.

When the welding metal 15 is applied, it is of course in a highly heated condition, so that the same will first be united to the surfaces with which it comes in contact; and subsequently, as the metal of the weld, and of the parts adjacent thereto, cools, it will contract; and thus tend to force the inclined surfaces more firmly together.

A pipe joint made by this method will be characterized by an effective internal seal provided by the forcing together of the frusto-conical end surface of the spigot portion of the joint and the inclined internal shoulder of the bell portion.

The provision of the external annular welding shoulder on the spigot portion of the joint will also serve to prevent weakening of the wall of the pipe at the point where the weld is made. Such a pipe joint will have ample structural strength to resist all ordinary strains to which it is likely to be subjected.

I claim:

A pipe joint having an uninterrupted straight cylindrical interior surface and comprising a pair of pipe sections, a spigot on the end of one section provided with an integral external annular shoulder, said shoulder having an inclined surface on the side toward the end of the spigot, the end of the spigot having a smooth frusto-conical surface, the interior wall of the spigot being a continuation of the interior wall of the pipe section and in alinement with the interior walls of both sections, a bell integrally formed on the end of the other section snugly fitting over the spigot end of the first section, a smooth internal inclined shoulder provided where the bell portion merges into the main body portion and complemental to the surface at the end of the spigot for engagement therewith, the end of the bell portion being chamfered, the bell and spigot portions being formed without diminution in wall thickness, welding metal deposited between the end of the bell portion and the external shoulder of the spigot portion, and the inclined end of the spigot portion being drawn into sealing engagement with the internal shoulder of the bell portion by contraction of the weld material incident to cooling.

EDMUND BROWN.